CRUDE OIL RECOVERY AT DIFFERENT NaOH CONCENTRATIONS IN MICELLAR DISPERSION

MICELLAR DISPERSION VISCOSITY AS A FUNCTION OF NaOH CONCENTRATION

United States Patent Office 3,493,051
Patented Feb. 3, 1970

3,493,051
INCREASING THE EFFICIENCY OF CRUDE OIL RECOVERY USING MICELLAR DISPERSIONS
William B. Gogarty, Littleton, Colo., assignor to Marathon Oil Company, Findlay, Ohio, a corporation of Ohio
Filed July 16, 1968, Ser. No. 745,329
Int. Cl. E21b 43/25, 43/22
U.S. Cl. 166—274                           16 Claims

ABSTRACT OF THE DISCLOSURE

Micellar dispersions containing hydrocarbon, aqueous medium, and ammonium petroleum sulfonate can be made more hydrophilic by incorporating up to a stoichiometric equivalent amount, based on the sulfonate, of alkali metal hydroxide into the micellar dispersion. In addition, the viscosity of the micellar dispersion can be adjusted upwardly with increased amounts of the alkali metal hydroxide. More efficient crude oil recovery can be obtained by these micellar dispersions wherein the latter are displaced through an oil containing porous media to recovery crude oil therefrom.

Background of the invention

United States Patent No. 3,254,714 to Gogarty et al. teaches a secondary-type recovery process using a micellar dispersion slug to displace crude oil from a subterranean formation. The micellar dispersion is injected into and displaced through the formation, preferably by a mobility buffer slug followed by drive water. Crude oil is recovered through a production means in fluid communication with the subterranean formation. This process is especially effective in tertiary oil recovery. Up to 100% of the oil in place can be recovered.

Applicant has discovered that micellar dispersion containing ammonium petroleum sulfonate can be made more hydrophilic, the viscosity can be adjusted, and more efficient crude oil recovery can be obtained by incorporating up to a stoichiometric equivalent amount, based on the active sulfonate, of alkali metal hydroxide into the micellar dispersion. In addition, the injectivity index of injection wells and the productivity index of producing wells can be improved by injecting into the well bore the dispersions of this invention.

Description of the invention

Figure 1:
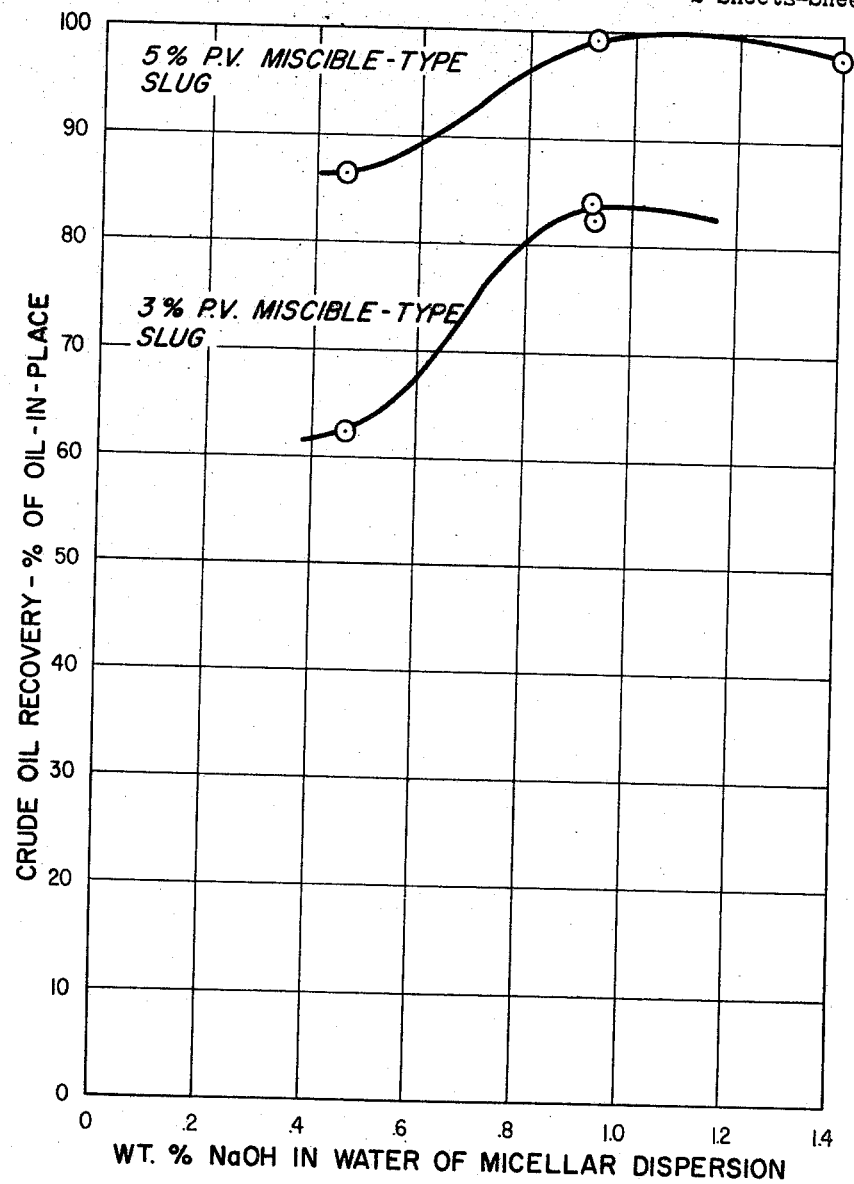
FIGURE 1 represents the relation of crude oil recovery (percent of oil in place) versus the weight percent of NaOH in the water of the micellar dispersion. The composition of the micellar dispersion is 59% crude column overheads, 8% ammonium petroleum sulfonate (average molecular weight of about 425 and about 79% active sulfonate), 31% water (obtained from the Palestine water reservoir in Palestine, Ill., hereafter identified as Palestine water, example of an analysis is 412 p.p.m. of total dissolved solids and a pH of 7.6–8.9), 0.15% of nonylphenol and from about 1.0 to about 1.8 percent isopropanol, percents based on volume. A 3% and a 5% pore volumn slug of the micellar dispersion at different concentrations of NaOH (weight percent based on water in the micellar dispersion) are displaced through Berea sandstone cores 4′ in length by 2″ in diameter. The Berea sandstone cores have been reduced to residual oil saturation by flooding with water. The micellar dispersions are followed by a thickened water slug containing Palestine water, 800 p.p.m. of Dow No. 530 Pusher (a high molecular weight, partially hydrolyzed polyacrylamide marketed by Dow Chemical Company, Midland, Mich.) and 4.0% by volume isopropanol. From FIGURE 1, the influence of NaOH on crude oil recovery is evident.
Figure 2:
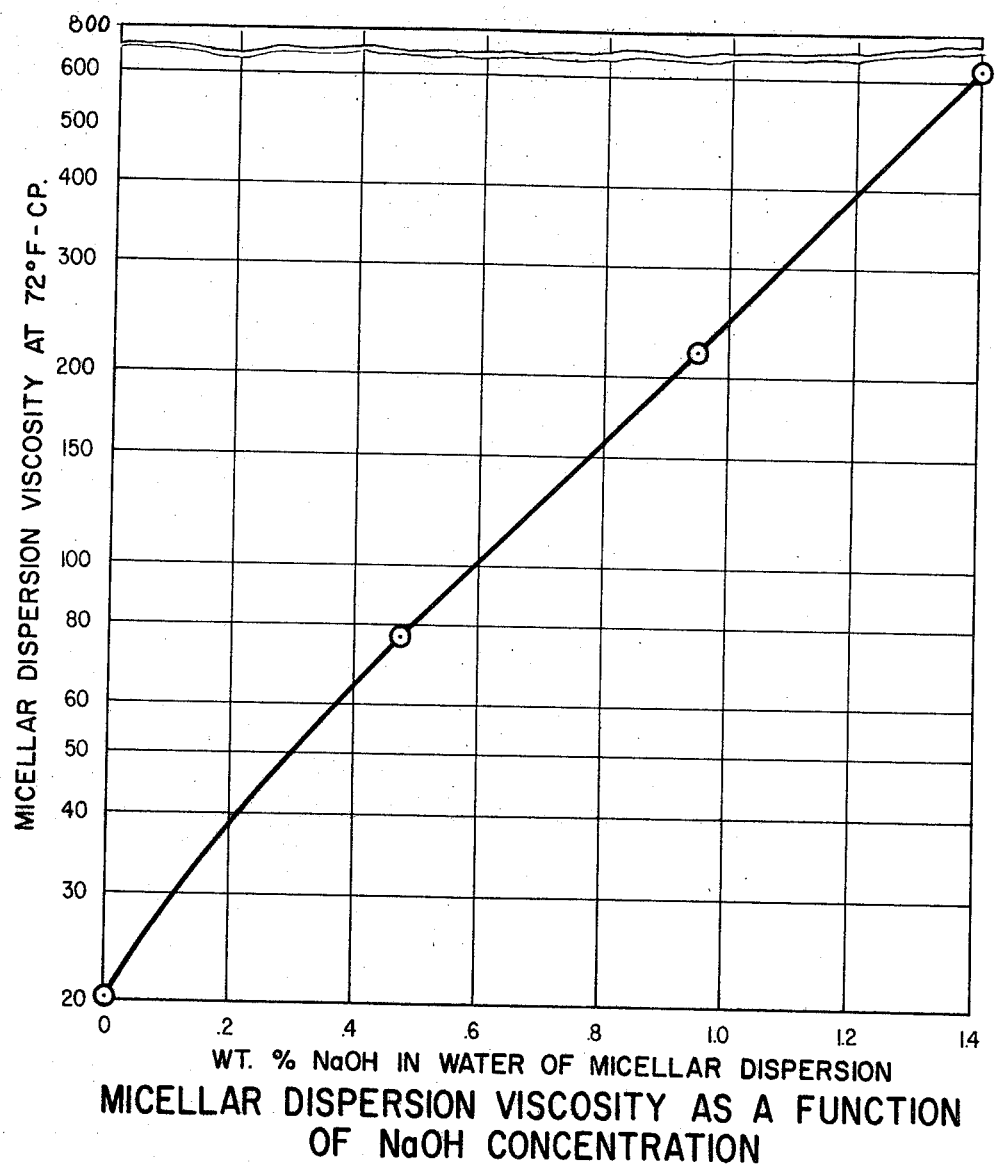
FIGURE 2 represents the influence of sodium hydroxide on the viscosity of a micellar dispersion containing ammonium petroleum sulfonate. In this particular figure, the data points are obtained by using a micellar dispersion containing 59.4% crude column overheads, 7.8% ammonium petroleum sulfonate (average molecular weight of about 425 and about 79% active sulfonate), 31.3% Palestine water, 0.15% nonylphenol, and 0.9 to 2.0% isopropanol, the percents based on volume. Different concentrations of NaOH (based on water in the dispersions) are incorporated into the micellar dispersion, the effect of which influences the viscosity as indicated in FIGURE 2.

The term "micellar dispersion" as used herein is meant to include micellar solutions, "micro-emulsions" [Schulman and Montagne, Annals of the New York Academy of Sciences, 92, pp. 366–371 (1961)], "transparent" emulsions (Blair, Jr. et al., United States Patent No. 2,356,205) and micellar dispersion technology taught by C. G. Sumner, Clayton's, The Theory of Emulsions and Their Technical Treatment, 5th edition, pp. 315–320 (1954). Micellar dispersions differ from emulsions in many ways, the strongest differentiation being that the former are thermodynamically stable whereas the latter are not.

The micellar dispersion is composed essentially of hydrocarbon, aqueous medium, and ammonium petroleum sulfonate of character sufficient to impart micellar dispersion characteristics to the mixture. Optionally, cosurfactant and electrolyte, other than the alkali metal hydroxide, can be incorporated into the dispersion. Examples of volume amounts include from about 4% to about 60% or more of hydrocarbon, from about 20% to about 90% of aqueous medium, at least about 4% of active ammonium petroleum sulfonate, from about 0.01% to about 20% of the cosurfactant, and from 0.001 to about 4% or more by weight of electrolyte. In addition, the micellar dispersion can contain corrosion inhibiting agents, bactericides, etc.

Up to a stoichiometric equivalent amount, based on active sulfonate, of alkali metal hydroxide is incorporated into the micellar dispersion. Preferably the alkali metal hydroxide is NaOH.

Examples of hydrocarbon include crude oil (both sweet and sour) and partially refined fractions thereof, e.g., side cuts from crude columns, crude column overheads, gas oils, kerosene, heavy naphthas, naphthas, straight-run gasoline, and liquefied petroleum gases. Pure hydrocarbons are also useful, e.g. paraffin compounds including propane, pentane, heptane, decane, dodecane, etc.; cycloparaffin compounds including cyclohexane, etc.; aryl compounds including benzene, naphthalene, anthracene, etc.; alkylated products thereof including toluene, alkyl phenols, etc. Based on economics, the preferred hydrocarbon is one locally available and is crude oil. The unsulfonated hydrocarbon (e.g. heavy vacuum gas oils) in petroleum sulfonates is also useful.

The aqueous medium can be soft, brackish, or a brine. Preferably, the water is soft but it can contain small amounts of salts which are compatible with the ions in the subterranean formation being flooded.

The ammonium petroleum sulfonates useful with the micellar dispersion are also known as ammonium alkyl aryl naphthenic sulfonates. Such can be obtained by sulfonating at least a portion of a sulfonatable hydrocarbon (e.g. gas oils) and then neutralizing the mixture with, e.g. ammonium hydroxide or ammonia. The resulting sulfonate can contain, after extraction, e.g. from about 50 to about 100% active sulfonate. The unsulfonated hydrocarbon within the sulfonate can be used as a hydrocarbon within this invention. Examples of preferred molecular weights of the ammonium petroleum sulfonates include those within the range of from about 360 to about 520 and more preferably from about 420 to about 470. Mixtures of low and high molecular weight ammonium petroleum sulfonates are also useful.

Examples of cosurfactants (also known as cosolubilizers or semi-polar organic compounds) useful with the invention include alcohols, amino compounds, esters, aldehydes and ketones containing from 1 to about 20 or more carbon atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and primary and secondary hexanols. Concentrations of from about 0.01% to about 20% by volume of cosurfactant are useful in the micellar dispersion and more preferably from about 0.1 to about 5.0%. Mixtures of two or more cosurfactants are useful.

Examples of useful electrolytes, other than the alkali metal hydroxides, include inorganic bases, inorganic acids, inorganic salts, organic bases, organic acids, and organic salts which are strongly or weakly ionized. Specific examples of electrolytes can be found in United States Patent No. 3,330,343. The type and concentration of electrolyte will depend on the aqueous medium, cosurfactant, hydrocarbon and the reservoir temperature. Generally from about 0.001% to about 4% by weight of electrolyte is useful. The electrolyte can be the salts within brackish or brine water.

The mobility of the micellar dispersion is desirably about equal to or less than the mobility of the formation fluids (i.e. combination of crude oil and interstitial water) ahead of the dispersion. Preferably, the micellar solution has a mobility favorable to protect against viscous instability.

Size of the micellar dispersion slug can be from about 1% to about 20% formation pore volume. Larger pore volumes are useful but such may be economically unattractive. More preferably, from about 2% to about 10% formation pore volumes are useful and from about 3% to about 6% formation pore volumes give very efficient oil recovery results.

The micellar dispersion is preferably followed by a mobility buffer. From about 5% to about 75% formation pore volume of the buffer is useful and more preferably from about 35% to about 60% formation pore volume. The size of the mobility buffer can be adjusted to satisfy the particular reservoir characteristics.

The mobility buffer should have the proper mobility to protect the micellar dispersion from invasion by the water drive, i.e. to reduce fingering tendency of the water into the micellar dispersion. Preferably, the mobility of the mobility buffer is about equal to or less than that of the micellar dispersion. From about 5% to about 100% of the mobility buffer can have graded mobilities from a low of the micellar dispersion to a high of the water drive.

After the mobility buffer is injected into the subterranean formation, sufficient water drive is injected to move or displace the micellar dispersion and mobility buffer toward a production well in fluid communication with the subterranean reservoir. Displaced crude oil is recovered through the production well.

The following examples are presented to illustrate specific working embodiments of this invention. These examples should not be construed as limiting the invention. Rather, it is intended that all equivalents obvious to those skilled in the art be included within the scope of the invention. Unless otherwise specified, percents are based on volume.

Example 1

To show that the sodium hydroxide imparts hydrophilicy to the micellar system, two micellar dispersion slugs substantially identical except one contains sodium hydroxide and the other sodium chloride, are flooded in Berea sandstone cores, the cores have been flooded to residual oil saturation by flooding with water containing 20,000 p.p.m. of dissolved solids. The micellar dispersions have the following compositions:

| Component | Micellar dispersion No. 1 | Micellar dispersion No. 2 |
| --- | --- | --- |
| (1) Hydrocarbon (straight-run gasoline) | 55.4 | 55.8 |
| (2) Aqueous medium (Palestine water) | 31.7 | 31.8 |
| (3) Cosurfactant (isopropanol) | 2.6 | 2.1 |
| (4) Surfactant (ammonium petroleum sulfonate avg. MW is about 425 and being about 79% active sulfonate) | 10.3 | 10.4 |
| (5) Electrolyte (a) NaCl | *0.39 | |
| (6) Alkali metal base (a) NaOH | | 0.27 |

*Weight percents based on the aqueous medium.

Micellar dispersion No. 1 has a pH of about 4 whereas micellar dispersion No. 2 has a pH of about 9. After 3.5 pore volumes of the micellar dispersions are displaced through the cores, the cores are examined for percent residual water in the core. The core flooded with dispersion No. 1 indicates a water concentration of about 0.12 percent pore volume whereas the core flooded with dispersion No. 2 indicates a water concentration of about 0.02 percent pore volume of water. These data indicate that the basic slug (i.e. the micellar dispersion containing NaOH) is more hydrophilic than the micellar dispersion containing NaCl (i.e. the more acidic dispersion). By removing more water, it is accepted that more oil will also be recovered from the core.

What is claimed is:

1. In a process of recovering crude oil from a subterranean formation having an injection means in fluid communication with a production means and wherein a micellar dispersion comprised of an ammonium petroleum sulfonate is injected into the formation and displaced therethrough to recover crude oil through the production means, the improved process comprising incorporating into the micellar dispersion up to a stoichiometric equivalent amount of alkali metal hydroxide, based on the active sulfonate within the micellar dispersion.

2. The process of claim 1 wherein the micellar dispersion contains hydrocarbon, cosurfactant, and aqueous medium.

3. The process of claim 1 wherein the alkali metal hydroxide is NaOH.

4. A method of improving the hydrophilic character of a flooding operation wherein a micellar dispersion comprised of ammonium petroleum sulfonate is injected through an injection means and displaced through a subterranean formation toward a production means to recover crude oil through the production means, the process comprising incorporating into the micellar dispersion up to a stoichiometric equivalent amount of alkali metal hydroxide, based on the active sulfonate.

5. The method of claim 4 wherein the micellar dispersion contains hydrocarbon, cosurfactant, and aqueous medium.

6. The method of claim 4 wherein the alkali metal hydroxide is NaOH.

7. A method of increasing the viscosity of a micellar dispersion comprised of ammonium petroleum sulfonate comprising incorporating up to a stoichiometric equivalent amount of alkali metal hydroxide, based on the active sulfonate, to obtain the increased viscosity.

8. The method of claim 7 wherein the micellar dispersion contains hydrocarbon and aqueous medium.

9. The method of claim 7 wherein the micellar dispersion contains hydrocarbon, cosurfactant, and aqueous medium.

10. The method of claim 7 wherein the alkali metal hydroxide is NaOH.

11. In a process of improving the injectivity index of an injection well by injecting a micellar dispersion comprised of ammonium petroleum sulfonate, the improved process comprising incorporating into the micellar dispersion up to a stoichiometric equivalent amount of alkali metal hydroxide, based on the active sulfonate within the dispersion.

12. The process of claim 11 wherein the micellar dispersion contains hydrocarbon, cosurfactant, and aqueous medium.

13. The process of claim 11 wherein the alkali metal hydroxide is NaOH.

14. In a process of improving the productivity index of a production well by injecting a micellar dispersion comprised of ammonium petroleum sulfonate, the improved process comprising incorporating into the micellar dispersion up to a stoichiometric equivalent amount of alkali metal hydroxide, based on the active sulfonate within the dispersion.

15. The process of claim 14 wherein the micellar dispersion contains hydrocarbon, cosurfactant, and aqueous medium.

16. The process of claim 14 wherein the alkali metal hydroxide is NaOH.

References Cited

UNITED STATES PATENTS

| | | | |
|---|---|---|---|
| 3,163,214 | 12/1964 | Csaszar | 166—274 |
| 3,254,714 | 6/1966 | Gogarty et al. | 166—274 |
| 3,297,084 | 1/1967 | Gogarty et al. | 166—274 X |
| 3,302,713 | 2/1967 | Ahearn et al. | 166—274 |
| 3,315,744 | 4/1967 | Dunlap | 166—274 X |
| 3,330,343 | 7/1967 | Tosch et al. | 166—274 X |
| 3,330,344 | 7/1967 | Reisberg | 166—275 X |
| 3,348,611 | 10/1967 | Reisberg | 166—274 X |
| 3,373,808 | 3/1968 | Patton | 166—275 |
| 3,373,809 | 3/1968 | Cooke | 166—274 X |

STEPHEN J. NOVOSAD, Primary Examiner

U.S. Cl. X.R.

166—273, 275, 305; 252—8.55